US009366227B2

(12) United States Patent
Garcia

(10) Patent No.: US 9,366,227 B2
(45) Date of Patent: Jun. 14, 2016

(54) CONTROL OF ELECTRIC OUTPUT OF A WIND PARK

(75) Inventor: Jorge Martinez Garcia, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 533 days.

(21) Appl. No.: 13/820,090

(22) PCT Filed: Aug. 29, 2011

(86) PCT No.: PCT/DK2011/050324
§ 371 (c)(1),
(2), (4) Date: Feb. 28, 2013

(87) PCT Pub. No.: WO2012/028150
PCT Pub. Date: Mar. 8, 2012

(65) Prior Publication Data
US 2013/0168963 A1 Jul. 4, 2013

Related U.S. Application Data

(60) Provisional application No. 61/378,551, filed on Aug. 31, 2010.

(30) Foreign Application Priority Data

Aug. 31, 2010 (DK) .................................. 2010 00777

(51) Int. Cl.
*F03D 7/00* (2006.01)
*H02J 3/18* (2006.01)
*H02J 3/38* (2006.01)

(52) U.S. Cl.
CPC ... *F03D 7/00* (2013.01); *H02J 3/18* (2013.01); *H02J 3/386* (2013.01); *Y02E 10/763* (2013.01); *Y02E 40/30* (2013.01)

(58) Field of Classification Search
None
See application file for complete search history.

(56) References Cited

U.S. PATENT DOCUMENTS 7,606,638 B2 * 10/2009 Fortmann ................ F03D 9/005
290/44
2010/0268393 A1 * 10/2010 Fischle .................... F03D 7/028
700/287

FOREIGN PATENT DOCUMENTS

| CA | 2700248 A1 | 3/2009 |
| EP | 1841037 A2 | 10/2007 |
| EP | 2175540 A2 | 4/2010 |
| WO | 2009080036 A1 | 7/2009 |
| WO | 2010025836 A2 | 3/2010 |

OTHER PUBLICATIONS

Denmark Patent Office, Denmark Patent Application No. PA 2010 00777, Office Action with Search Report dated Apr. 15, 2011, 4 pages.

(Continued)

*Primary Examiner* — Ryan Jarrett
(74) *Attorney, Agent, or Firm* — Patterson + Sheridan, LLP

(57) ABSTRACT

A method of controlling an electric output of a wind park is carried out jointly by wind turbines with their local wind-turbine controllers and a central wind-park controller. The central wind-park controller generates a reference value for a wind turbine, based on the measured value of an electric quantity at a point of common measurement, and provides it to the local wind-turbine controller. The local wind-turbine controller produces a voltage or a reactive-power in the electric grid at the location of the wind turbine corresponding to the reference value, but which is corrected by a local correction. The local correction takes into account a voltage or a reactive-power change expected at the point of common measurement for the electric current supplied by the wind turbine due to the electric impedance of the grid connection to the point of common measurement.

15 Claims, 9 Drawing Sheets

(56) References Cited

OTHER PUBLICATIONS

European Patent Office, International Application No. PCT/DK2011/050324, International Search Report and Written Opinion dated May 18, 2012, 10 pages.

Shului et al., "Characteristic Study for Integration of Fixed and Variable Speed Wind Turbines into Transmission Grid," Proceedings of 2008 IEEE PES (Power & Energy Society) Transmission & Distribution Conference and Exposition, Chicago, IL, Apr. 21-24, 2008, pp. 1-9.

* cited by examiner

CONTROL OF ELECTRIC OUTPUT OF A WIND PARK

FIELD OF THE INVENTION

The present invention relates to a method of controlling an electric output of a wind park which, for example, is jointly carried out by wind turbines with their local wind-turbine controllers and a central wind-park controller. The invention also relates to a wind park with electric-output control functionality.

BACKGROUND OF THE INVENTION

The document J. T. G. Pierik et al., Electrical and Control Aspects of Offshore Wind Farms II (Erao II), Volume 2: Offshore wind farm case studies, ECN, 2004, Chapter 8, p. 97-118, describes in the context of voltage control at the connection point of a wind park that this control can be achieved in two ways: centralised control, in which one controller gives reactive-power set-points to all wind turbines, or decentralised control, in which each wind turbine has its own controller, based on local parameters (p. 106/107). In decentralised control, there is no central controller, and the wind turbines' local controllers control the voltage at the wind turbines' terminals. The voltage level at the connection point can be calculated, and the calculated connection-point voltage can be controlled (p. 107-109).

CA 2 700 248 A1 (Repower) describes a wind park with voltage regulation. A wind-park controller (referred to as "farm master") transmits a control signal for the reactive power to the wind turbines. An additional controller is provided at the wind turbines. When the additional controller identifies a voltage dip at the wind turbine's terminals, there is no need for it to wait for the delayed transmission of a new value of the control signal from the wind-park controller. Instead it anticipates the required change in the reactive power. The new value of the control signal from the wind-park controller which arrives later ensures that sufficient steady-state accuracy is reached.

U.S. Pat. No. 7,606,638 B2 (Repower) describes a wind park with a reactive-power adjustment system. A wind-park controller (referred to as a "higher-level regulator") and wind-turbine controllers (referred to as "lower-level regulators") are provided. The wind-park controller determines a reference voltage, in order to set a global power coefficient, and transmits it to the wind turbine controllers. The reference voltage for each wind turbine can also be determined individually for each wind turbine to adapt it to the respective connecting line with its electric parameters. This determination of the individual reference voltages is performed centrally by the wind-park controller. At the wind-turbine controllers the individual reference voltage is limited by limiting device if the reference voltage has an excessive value. The reference voltage is locally feedback-controlled by the wind-turbine controllers thereby ensuring that the voltage at the wind turbines corresponds to the individual reference voltages prescribed by the central wind-park controller.

Similar voltage control is known from EP 2175540 A2 which, however, deals with a system of multiple wind parks ("windfarm") and a control structure with local windfarm controllers and a superordinate windfarm-system controller. Signals to compensate for line drops are provided by the superordinate windfarm-system controller to the local windfarm controllers.

SUMMARY OF THE INVENTION

A method of controlling an electric output of a wind park is provided. The wind park comprises wind turbines, local wind-turbine controllers, a central wind-park controller, a point of common measurement, and an electric grid connecting the wind turbines and the point of common measurement, wherein grid connections between the wind turbines and the point of common measurement have electric impedances. The method is carried out jointly by the wind turbines with their local wind-turbine controllers and the central wind-park controller. The method comprises: producing electric currents, by the wind turbines, and supplying the electric currents to the electric grid; measuring a value of an electric quantity at the point of common measurement and providing the measurement result to the central wind-park controller; generating, by the central wind-park controller, at least one of a voltage-reference value and a reactive-power-reference value for a wind turbine, based on the measured value of the electric quantity at the point of common measurement, and providing the at least one of a voltage-reference value and a reactive-power-reference value to the local wind-turbine controller of the wind turbine; causing the wind turbine, by the local wind-turbine controller, to produce at least one of a voltage and a reactive-power in the electric grid at the location of the wind turbine which corresponds to the at least one of a voltage-reference value and a reactive-power-reference value, but which is corrected by a local correction produced by the local wind-turbine controller. This local correction takes into account at least one of a voltage change and a reactive-power change expected at the point of common measurement for the electric current supplied by the wind turbine due to the electric impedance of the grid connection between the wind turbine and the point of common measurement. Said electric current taken into account by the correction is determined locally at the wind turbine.

According to another aspect, a wind park is provided, comprising wind turbines, local wind-turbine controllers, a central wind-park controller, a point of common measurement, and an electric grid connecting the wind turbines and the point of common measurement. Grid connections between the wind turbines and the point of common measurement have electric impedances. The wind park is arranged to control its electric output by jointly controlling the wind turbines by means of their local wind-turbine controllers and the central wind-park controller. The wind turbines are arranged to produce electric currents and supply them to the electric grid. The central wind-park controller is arranged to generate at least one of a voltage-reference value and a reactive-power-reference value for a wind turbine, based on a value of an electric quantity measured at the point of common measurement, and to provide the at least one of a voltage-reference value and a reactive-power-reference value to the local wind-turbine controller of the wind turbine. The local wind-turbine controller is arranged to cause the wind turbine to produce at least one of a voltage and a reactive-power in the electric grid at the location of the wind turbine which corresponds to the at least one of a voltage-reference value and a reactive-power-reference value, but which is corrected by a local correction produced by the local wind-turbine controller. This local correction is arranged to take into account at least one of a voltage change and a reactive-power change expected at the point of common measurement for the electric current supplied by the wind turbine due to the electric impedance of the grid connection between the wind turbine and the point of common measurement, said electric current taken into account by the correction being determined locally at the wind turbine.

Other features are inherent in the methods and products disclosed or will become apparent to those skilled in the art from the following description and the accompanying drawings.

BRIEF DESCRIPTION OF THE DRAWINGS

Embodiments of the present invention are explained by way of example with reference to the accompanying drawings, in which.

Figure 1:
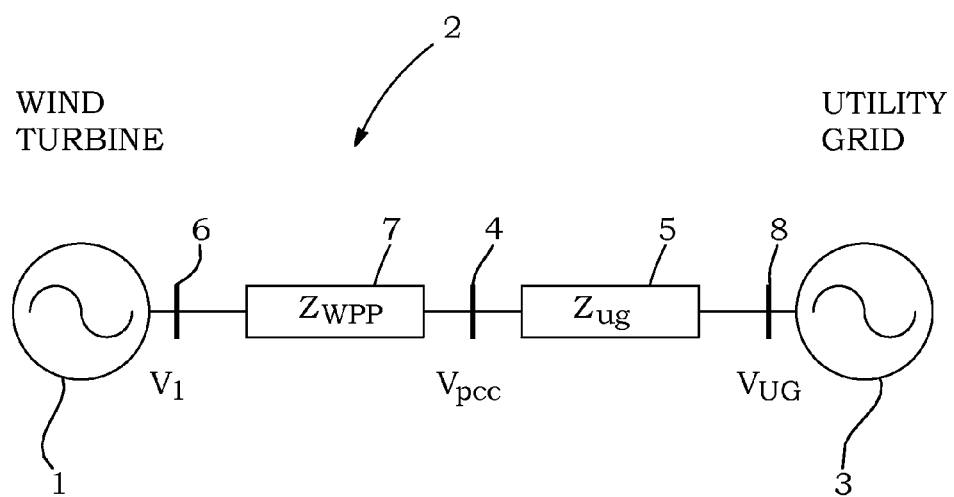
FIG. 1 is a highly schematic circuit diagram of a wind park connected to a utility grid.

The drawings and the description of the drawings are of embodiments of the invention and not of the invention itself.

DETAILED DESCRIPTION OF EMBODIMENTS

Before turning to the detailed description of embodiments on the basis of the drawings, a few more general items of embodiments will be discussed.

A wind park according to the embodiments has a plurality of wind turbines. Each wind turbine has a local wind-turbine controller which controls operation of the wind turbine. For example, the wind-turbine controller determines whether the wind turbine shall operate, at the current wind speed, in a partial-load mode (in which the efficiency of energy conversion is optimised) or a nominal-load mode (in which nominal power is produced, even if the wind speed would allow production of more power). Besides mechanical operation parameters, such as rotor speed and blade pitch, the wind-turbine controller controls electric-output parameters, such as the current or power produced by the wind turbine, or more specifically, the active and reactive components of the current, or the active and reactive power produced by the wind turbine. Control of the electric output is performed by influencing the wind turbine's power converter.

The wind turbines of the wind park of the embodiments are electrically connected by an electric grid, and each wind turbine feeds the electric current produced by it into the electric grid. There is at least one common electric measurement point in the electric grid, referred to as point of common measurement, or PCM.

In some of the embodiments, the point of common measurement is a point at which the internal electric grid of the wind park is coupled to the electric utility grid; this point is also referred to as the point of common coupling, or PCC. In other embodiments, it is a point within the wind park's internal grid, upstream of the point of common coupling. In still other embodiments it is a more distant point in the utility grid, downstream of the point of common coupling.

In the embodiments, a wind-park controller is also provided. A wind-park controller is a central controller taking care of certain electric output parameters of the wind-park. In the embodiments, a value of an electric quantity is measured at the point of common measurement, and the measurement result is provided to the central wind-park controller. This does not, of course, exclude further quantities from being measured, e.g. at the point of common measurement, and provided to the wind-park controller. In some of the embodiments the electric quantity is the voltage at the point of common measurement, in other embodiments it is the reactive power passing the point of common measurement, or both the voltage and the reactive power. Further quantities may be, e.g. the active power passing the point of common measurement and/or the frequency at the point of common measurement.

The reactive component of electricity can be characterised in different ways, for example in relative terms, e.g. by the phase angle $\phi$ between voltage and current, the value of $\cos \phi$ (which is also called "power factor" and equals the ratio of the active power and the apparent power) plus an indication whether a reactive component is capacitive or inductive, or in absolute terms, e.g. by the absolute value of the reactive current $I_q$ or the reactive power Q, etc. In the present document, when reference is made to a measurement of, or reference/set-point for, the "reactive power", any measurement of, or reference/set-point for, another parameter representative of the reactive component of electricity can be used.

The wind-park controller takes care of certain electric parameters of the wind-park production as a whole, e.g. the grid voltage at the point of common measurement, or the reactive power produced by the wind park at the point of common measurement, by providing references (i.e. set points) to the individual wind turbines which prescribe what a wind turbine has to deliver. However, as a wind park usually has to produce as much active power as possible at a currently prevailing wind speed, the central controller does not normally govern active-power production, but this is rather governed by the wind, unless it is limited by the nominal-power limit of the wind turbines. In other words, normally a wind turbine autonomously produces as much active power as possible, or limits its active-power production to nominal power if the wind speed is above nominal. Since the wind speed will usually fluctuate, this means that the total amount of active power produced by the wind park is normally not controlled, or limited, by the wind-park controller, but is rather an entity which fluctuates in a manner which cannot be anticipated by the wind-park controller. There may be exceptions, e.g. in the case of a global overproduction in the utility grid, when the grid provider requires the active-power production to be reduced, or when a frequency rise is observed; then the wind-park controller can command the wind turbines to reduce their active-power production. Thus, the wind-park controller does not normally know the amount of active power produced by an individual wind turbine (at least not instantly; the information about individual active power production may be transmitted from the wind-turbine controllers to the wind-park controller, but such a transmission takes time so that the knowledge about individual active power production would only arrive with a delay at the wind-park controller).

Although the control is generally under the direction of a centralised wind-park control, the control method is carried out jointly by the central wind-park controller and wind turbines with their local wind-turbine controllers. The central wind-park controller controls electric wind-park parameters, such as the voltage or the reactive power, at the point of common measurement, by providing set-points to the individual wind turbines commanding them to provide for certain local electric parameters, e.g. local voltage or local reactive power, at the wind turbines' terminals. However, the local wind-turbine controllers do not only execute what is prescribed by the wind-park controller, but also anticipate and compensate the effect on the point of common measurement of a change in local output, e.g. an increase of the active power produced by the individual wind turbine due to an increase of the wind speed, or a change of reactive power produced as a result of a corresponding set-point change by the wind-park controller, due to the impedance of the grid connection between the wind turbine and the point of common measurement. This function is achieved by a local correction performed individually by the wind-turbine controllers. Thus, in the embodiments the local correction performed in each wind-turbine controller decouples the wind-park controller from changes of the power, or the currents, produced by the individual wind turbines.

Returning to functionalities of the central wind-park controller, in some embodiments the central wind-park controller generates at least one of a voltage-reference value and a reactive-power-reference value for the wind turbines, based on the measured value of the electric quantity at the point of common measurement, and provides the at least one of a voltage-reference value and a reactive-power-reference value to the local wind-turbine controller of the respective wind turbine. The measured quantity and the reference do not necessarily have to be of the same type; for example, voltage and droop control can be performed by measuring the voltage at the point of common measurement, while providing a reactive-power reference to the wind turbines, based on the measured voltage.

In some embodiments, the reference values generated by the central wind-park controller are the same values for all the wind turbines of the wind park. In some embodiments, all the wind turbines get the same reference value, but the reference value is a relative parameter (e.g. a relative parameter indicative of reactive power, such as a power factor). The parameter can be, e.g. relative to a nominal parameter, such as the nominal power of a wind turbine, so that the same reference value sent to all wind turbines causes wind turbines of different nominal power (e.g. different types) in the wind park to accordingly produce electricity of different absolute magnitude. For example, wind turbines with a higher nominal power then produce more reactive power than those with a lower nominal power. In still other embodiments the central wind-park controller assigns individual values to different wind turbines of the wind park. For example, when some wind turbines in the wind park (that is to say the turbines in the first row) are already producing nominal active power while others (in the rear rows) are producing less, the individual set-points are provided by the wind-park controller such that the turbines working at lower power provide a larger part of the required reactive power than those that are producing nominal power already.

In some of the embodiments, the control function performed by the central wind-park controller is feed-forward control. For example, wind parks contributing to voltage control in the utility grid perform droop control, that is to say deliver reactive power depending on the voltage, e.g. measured at the point of common measurement according to a predefined droop function (i.e. a function which maps voltage to reactive power). For example, the wind-park controller determines reactive-power reference values (i.e. set-points) for the individual wind turbines, using the droop function. Seen from a higher level of abstraction, droop control is feed-forward control. However, at an implementation level, droop control can be implemented in a manner including feedback control, so as to precisely follow the prescription by the droop function—for such implementations the following description of feedback control may also apply to droop control.

In other embodiments the central wind-park controller performs feedback control. For example, generation of the reference value by the central wind-park controller comprises comparing the electric quantity measured at the point of common measurement, or another quantity derived from it, with a central target value, and obtaining the reference value from a result of the comparison, i.e. from the error between the measured quantity (or the quantity derived from it) and the central target value. Production of an error signal is an element of (closed-loop) feedback control. An exemplary application is voltage control in which the voltage at the point of common measurement is kept constant by feed-back control. Droop control, in some embodiments, also involves feedback control as it is verified by measurements at the point of common measurement that the reactive-power reference according to the droop function is actually delivered, and any observed discrepancy is removed by feedback-control-based adjustment of the reference value by the central wind-park controller.

The feedback control loop is formed by the wind-park controller comparing the electric quantity measured at the point of common measurement with a central target value to produce an error signal and deriving the reference values for the wind turbines from the error signal, and the local wind-turbine controllers causing the wind turbines to produce at least one of a certain voltage and a certain reactive-power in the internal grid at the locations of the wind turbines (e.g. at the wind turbines' terminals), which in turn influences the electric quantity to be measured at the point of common measurement and compared with the central target value.

In some embodiments, the central target value is a constant; e.g. a constant voltage or a constant reactive power. For example, the central wind-park controller can keep the voltage at the point of common measurement constant by producing voltage or reactive-power reference values for the individual wind turbines which cause them to counteract any voltage deviation measured at the point of common measurement. In other embodiments, the central target value is a prescription externally provided by a grid provider, e.g. a reactive-power prescription which may vary slowly over the day. For example, the central wind-park controller can keep the reactive-power at the point of common measurement at the prescribed value by producing voltage or reactive-power reference values for the individual wind turbines which cause them to counteract any reactive-power deviation measured at the point of common measurement. In other embodiments the wind park performs droop control, e.g. the voltage measured at the point of common measurement is mapped to reactive power according to a predefined droop function, and the value of the reactive power thus obtained forms the central target value. The central wind-park controller can keep the reactive-power at the point of common measurement at the target value obtained from the mapping by the droop function by producing voltage or reactive-power reference values for the individual wind turbines which cause them to counteract any reactive-power deviation measured at the point of common measurement from the target value.

However, the control described is not "pure" feedback control, but is feedback control with overlaid feed-forward control, in the form of the local correction performed by the local wind-turbine controllers. The local wind-turbine controllers do not cause the wind turbines to produce exactly the voltage or reactive power prescribed by the reference from the central wind-park controller, but apply their local correction. The local correction is produced, for example calculated, by the respective wind-turbine controller. It is produced, or calculated, such that it takes into account at least one of a voltage change and a reactive-power change expected at the point of common measurement for the electric current supplied by the wind turbine, due to the electric impedance of the grid connection between the wind turbine and the point of common measurement. The electric current taken into account by the local correction is determined (e.g. measured) locally at the wind turbine. The value of the current determined (e.g. measured) locally at the wind turbine enters as an input value into the calculation by the wind-turbine controller of the voltage change and/or reactive-power change expected at the point of common measurement due to the electric current supplied by the wind turbine. The local correction causes the wind turbines to produce an output corrected for a voltage change or a reactive-power change expected for the electric currents supplied by the wind turbines due to the electric impedances of the grid connections between the wind turbines and the point of common measurement.

The local correction takes into account at least one of a voltage change and a reactive-power change expected to be caused at the point of common measurement by a change of the electric current supplied by the wind turbine. If the current supplied by the wind turbine changes, a voltage change and/or a reactive-power change will normally be caused at the point of common measurement by the electric impedance of the grid connection between the wind turbine and the point of common measurement. This impedance-caused voltage and/or reactive-power change at the point of common measurement is compensated by the correction, that is to say by causing the wind turbine to produce a modified amount of reactive current or power. To figure out the amount of correction required to compensate the impedance-caused voltage and/or reactive-power change at the point of common measurement, the characteristics of the electric current (e.g. its magnitude and reactive component) are determined (for example, measured or derived from other known parameters) locally at the wind turbine.

As indicated above, since the wind speed will usually fluctuate the amount of active power produced by a wind turbine in the partial-load mode is normally not controlled, or limited, to a reference value, but is rather an entity which fluctuates in a manner which cannot be anticipated. Thus, the wind-park controller does not normally know instantly the amount of active power, or active current, produced by an individual wind turbine. However, the amount of active power, or active current, produced influences the voltage drop over the line from the wind turbine considered to the point of common measurement. A central wind-park controller could not therefore provide reference values to correct for this voltage drop which would instantly take into account the influence of such fluctuations of the amount of active power, or active current, produced. However, determining the characteristics of the current produced (e.g. its magnitude and/or reactive component) locally at the wind turbine and basing a local correction for said voltage drop by the wind-turbine controller, as described herein, enables the influence of such fluctuations of the amount of active power, or active current, produced on the voltage drop to be compensated.

This is different from the teaching of U.S. Pat. No. 7,606,638 B2 mentioned at the outset according to which the voltage reference values for the individual wind turbines come from the central wind turbine controller. It has not been recognised in US '638 that such fluctuations of the active power, or active current, produced have an influence on the voltage drop, and the voltage-drop correction included in the reference values of US '638 are therefore apparently constant average or nominal values. Therefore, there is no disclosure in US '638 that the current produced by an individual wind turbine is measured, let alone that used in the voltage-drop correction performed by the central wind-park controller. Hypothetically, even if information about current currently produced by the individual wind turbines were transmitted from the wind turbines to the central wind-park controller and taken into account for it in the reference values sent to the wind turbines this would only happen with a corresponding transmission delay. The same applies to EP 2175540 A2 also mentioned at the outset.

Thus in some of the present embodiments the control structure is a feedback control loop including the wind-park controller with overlaid feed-forward corrections by the individual wind turbine controllers to decouple changes of the currents produced by the individual wind turbines from the outer feedback control loop.

Typically, the data transmission rate of the data connection between the central wind-park controller and the wind turbine is relatively low, so that the time needed for the reference signal to travel from the central wind-park controller to the wind turbine may be significant, resulting in a relatively large time constant of the central wind-park control loop (the expression "time constant" refers to the time needed for a controller to adapt the system controlled to a sudden change (step change) of the target parameter or a disturbance). The local correction reduces the perturbations to the central wind-park controller due to changes of the currents produced by the individual wind turbines in a feed-forward manner, i.e. without any feedback delay. Without the local correction function, or decoupling function, the relatively slow central wind-park controller would need more time to compensate these perturbations. If a change of the current or power produced by the wind turbine occurs (e.g. due to a change of the wind speed), the fast local correction will immediately, in a feed-forward manner, cause the wind turbine to deviate in its voltage or reactive-power production from the voltage or reactive-power reference prescribed by the wind-park controller, so as to ensure, on the shorter time-scale of the correction's time constant, that the voltage or reactive power prevailing at the point of common measurement does not, or not significantly, change. In embodiments with a central wind-park controller in the form of closed-loop feedback control, the closed-loop central wind-park controller will perform fine-tuning of the correction, if the correction is not completely correct, due to its feed-forward character.

In some embodiments the local feed-forward activity has differential characteristics, i.e. the correction effectively only responds to changes of the power or current produced, but the effective amount of corrective action approaches zero towards the steady state. If a change of the current or power produced by the wind turbine occurs, the differential characteristics will cause the wind turbine to deviate in its voltage or reactive-power production from the voltage or reactive-power reference prescribed by the wind-park controller, so as to ensure, immediately at the moment when the change takes place, that the voltage or reactive power prevailing at the point of common measurement does not, or not significantly, change. However, assuming that no other change happens, due to the differential characteristics, the effective correction will approach zero, and finally vanish, while the closed-loop central wind-park controller will gradually take over control, i.e. gradually adapt its reference value to the new steady-state current or power value.

Although the local correction performed by the wind-turbine controller can be considered as feed-forward control at the level of the central wind-park controller's control loop, in some embodiments the local wind-turbine controller also comprises a local feed-back control. For example, the voltage and/or the reactive power is measured in the internal grid at the wind turbine (e.g. at the wind turbine's terminals) and the local wind-turbine controller compares the locally measured value of the voltage and/or reactive power with the wind-park controller's reference value, and generates a local error signal on which control of the wind turbine is based, thereby forming a local feedback control loop.

In U.S. Pat. No. 7,606,638 B2 mentioned at the outset individual voltage reference signals are provided to the wind turbines by a central wind-park controller. At the level of each wind turbine a feed-back controller is provided. The feedback controller measures the actual voltage at the wind turbine at issue, compares it with the reference voltage value, and causes a modification of the wind turbine's production if there is an error between the reference voltage and the measured actual voltage causing such an error to disappear. The function of such a feed-back error signal is to ensure that a voltage reference value prescribed by the central wind-park controller is actually complied with at the wind-turbine level; the feed-back error signal is, however, no correction of the reference value provided by the central wind-park controller. By contrast, in the present embodiments the "local correction" is a correction of a reference value provided by the central wind-park controller so that the wind turbine's production does not comply with the reference value provided by the central wind-park controller but with the reference value modified by the local correction.

There are several alternative ways of effectively correcting the reference value provided by the central wind-park controller, by introducing the local correction in different alternative ways into the local feedback control loop. In some embodiments the local correction is applied downstream of (i.e. after) the local-error-signal generation, that is to say the local error signal is produced as if there were no correction, and only the already-produced error signal, or a parameter derived from the error signal, is modified by the correction. In other embodiments, the local correction is applied at the local-error-signal generation, e.g. at the summation block which performs the summation of the reference value and the (negated) value of the voltage or reactive power measured at the wind turbine; in other words, the correction signal is inserted in the summation block as a further summand besides the reference value and the (negated) value measured at the wind turbine. In still other embodiments, the local correction is applied upstream of (i.e. before) the local-error-signal generation, e.g. by adding it to the reference value from the wind-park controller, or subtracting it from the value measured at the wind turbine. As a result of all these alternatives, the wind turbine's production will not comply with the reference value provided by the central wind-park controller but with the reference value modified by the local correction.

The same applies to embodiments without a local feedback control loop, i.e. embodiments in which the reference value provided by the central wind-park controller is an input of an local feed-forward controller. In these feed-forward embodiments the "local correction" is also a correction of the reference value provided by the central wind-park controller, which causes the wind turbine's production not to comply with the reference value provided by the central wind-park controller but with the reference value modified by the local correction.

Returning to embodiments with local feed-back control, in some of those embodiments in which the local correction is applied after the local-error-signal generation, the time-constant (or the bandwidth) of the local wind-turbine controller is greater than the time-constant (or the bandwidth) of the correction, so as to prevent the local feed-back wind-turbine controller from compensating the correction; such compensation will only happen towards the steady-state limit.

In some embodiments the reference from the central wind-park controller is, e.g. a voltage or reactive-power value, the parameter measured locally at the wind turbine is also a voltage or reactive-power value, and thus the error signal obtained by adding the reference and the (negated) measured value is also a voltage or reactive-power (error) value. In some of the embodiments, the local error signal, which is, e.g. a voltage or reactive-power error signal is transformed into a local current reference for the wind-turbine converter. The transformation into a local current reference is e.g. performed by a local-current controller block which has, for example, PI (proportional and integral) characteristics. The current reference prescribes what current the converter shall produce; it normally includes references for the reactive and active current components to be produced.

In embodiments in which the local correction is applied after the local-error-signal generation and after the transformation into a local current reference (i.e. downstream of the current controller), the local correction is provided in the form of a current-correction signal, and the local current reference is corrected by the current-correction signal. For example, the current-correction signal is added to the local current reference. As indicated above, in order to prevent the local feedback wind-turbine controller from compensating the correction, the time-constant (or the bandwidth) of the current controller is greater than the time-constant (or the bandwidth) of the correction.

In other embodiments in which the local correction is applied before the transformation from voltage or reactive power takes place (i.e. before the current controller, e.g. at or upstream of the local-error-signal generation), the local correction is provided in the form of a voltage or reactive-power correction signal. For example, the voltage or reactive-power correction signal is added to the reference value from the wind-park controller, subtracted from the voltage or reactive-power value measured at the wind turbine, or applied as a further summand to the subtractor which determines the difference between the reference value and the measured value.

In some of the embodiments, the local correction is determined by the local wind-turbine controller on the basis of a function of which the electric current or power produced by the wind turbine and measured or determined at the wind turbine's terminal is an independent variable of the function. As discussed above, the electric current or reactive power is not known to the wind-park controller a priori, because at least in partial-load operation (i.e. below the nominal wind speed of the wind turbine) the electric current produced is governed by the wind speed, which will generally fluctuate, and the fluctuations will be first felt by the wind turbine. Due to the relatively large time constant of the central wind-park controller it would take longer if it were the central wind-park controller's task to compensate perturbations, e.g. caused by wind-speed fluctuations, at the point of common measurement.

In some of the embodiments the local correction is determined by the local wind-turbine controller on the basis of a function which has at least two additive terms. One of the additive terms depends on the total current injected by the wind turbine at the wind turbine's terminals (the total current includes the active and the reactive component), and the other additive term depends on the active component of the current injected by the wind turbine at the wind turbine's terminals. In some embodiments the dependence on the total current is quadratic. The other parameters entering the local-correction function are grid impedances; the grid impedances remain constant for a given wind park and grid, and are therefore constants. In some embodiments the determination of the local correction comprises evaluating the correction function by inserting the present values of the total current and the active component of the current in the correction function and calculating the function result. In other embodiments, the correction function is represented by a look-up table which contains already calculated (or experimentally determined) function results for a plurality of total-current and active-current values; determining the local correction comprises looking up the table entry closest to the present values of the total current and the active component (or interpolating the table entries close to the present values of the total current and the active component of the current).

The central wind-park controller and the local wind-turbine controllers computers, e.g. microcontrollers, with memories able to store computer code. The method carried out by the controllers is preferably provided in the form of a computer program for the wind-park controller and a computer program for the local wind-turbine controllers stored in the memory of the wind-park controller and the local wind-turbine controllers, respectively. The programs can be executed by the controllers. The method described is performed when the programs are executed. The "local correction" mentioned in the independent product claim (wind-park claim) is, e.g. a part of the computer program for the local wind-turbine controllers which causes the local correction to be determined, when executed on a local wind-turbine controllers. The expression " . . . controller is arranged to [plus method-related activities]" in the independent product claim means that the controllers are programmed such that the program causes the claimed method-related activities to be carried out when the computer program is executed. The wind park defined in this manner is at least distinguished by this special programming (i.e. storage of this special computer program) from wind parks with the same hardware which are, however, not arranged (e.g. not programmed) to carry out said method-related activities.

FIG. 1: Exemplary Local Correction Function

Figure 2:
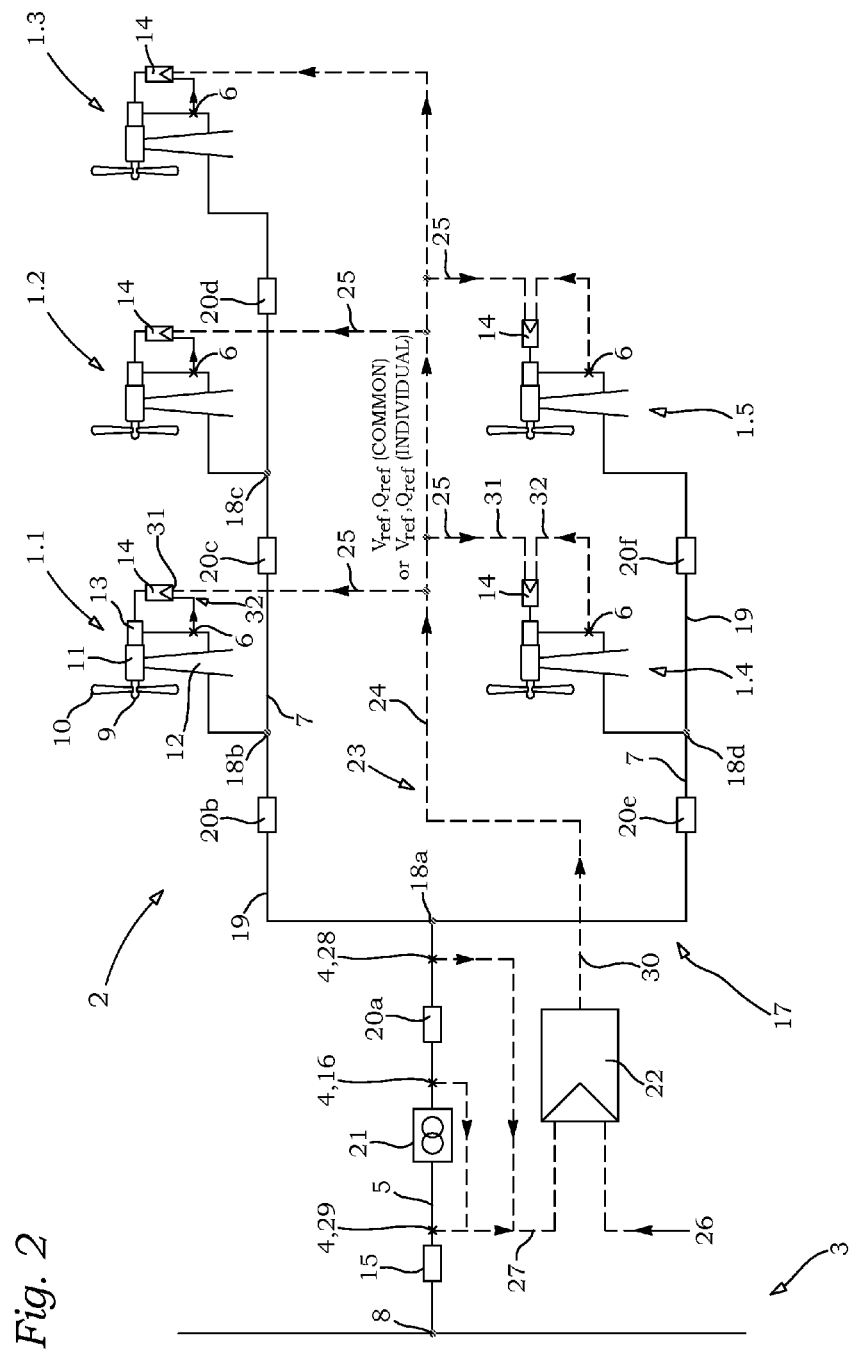
FIG. 2 is a schematic overview of an embodiment of a wind park.

A derivation of an exemplary approximate local-correction function is now presented, based on the schematic circuit-diagram of a wind park 2 connected to a utility grid 3. Only a single wind turbine 1 of the wind park 2 is shown in FIG. 1. In the embodiment of FIG. 1, the point of common measurement 4 is the wind park's 2 point of common coupling 16 (FIG. 2), denoted by "PCC", at which the wind park 2 is connected by a branch line 5 to the utility grid 3. In other embodiments, the PCC may be replaced by another point of common measurement, as will be explained in connection with FIG. 2. Thus, "PCC" mentioned in FIG. 1 and its explanation may also stand for other points of common measurement. The line connecting the wind turbine's 1 terminals 6 with the PCC is denoted by "7"; it forms a part of the wind-park-internal grid 17 (FIG. 2). The point where the branch line 5 is coupled to the utility grid 3 is denoted by "8". The sub-indices "WPP" and "UG" stand for "wind power plant" and "utility grid", and the sub-index "1" refers to (the terminals of) the wind turbine 1. The impedance of the line 7 is denoted by $Z_{WPP}$, and the impedance of the line 5 is denoted by $Z_{UG}$. The voltages at 6, 4 and 8 are denoted by $V_1$, $V_{PCC}$, and $V_{UG}$.

The voltage drop across $Z_{WPP}$ is $V_1$ and the voltage drop across $Z_G$ is $V_{PCC}$:

$$V_1 \approx X_{WPP}I_{q1} + R_{WPP}I_{d1} + V_{PCC} \quad (1)$$

$$V_{PCC} \approx X_G I_{qPCC} + R_G I_{dPCC} + V_{UG} \quad (2)$$

where X and R denote the reactive and active components of Z (respectively), and the sub-indices q and d denote the reactive and active components (respectively), so that $X_{WPP}$ and $R_{WPP}$ denote the reactive and active components of $Z_{WPP}$, and $I_{q1}$ and $I_{d1}$ denote the reactive and active components of the current injected by the wind turbine 1 at its terminals 6.

The reactive and active power at PCC, $Q_{PCC}$ and $Q_{PCC}$, is calculated as follows:

$$Q_{PCC} = Q_1 - X_{WPP}I_1^2 = V_{PCC}I_{qPCC} \quad (3)$$

$$P_{PCC} = P_1 - R_{WPP}I_1^2 = V_{PCC}I_{dPCC} \quad (4)$$

where $Q_{PPC}$ and $P_{PPC}$ denote the reactive and active power at the PCC, $I_1$ denotes the total current injected by the wind turbine 1 at its terminals 6, and $I_{qPCC}$ and $I_{dPCC}$ denote the reactive and active components of the current at the PCC.

For small changes, the following approximation can be made: $V_{pcc} \approx V_1 \approx$ pu, where pu ("per unit") is a relative voltage unit referring to the nominal voltage. With this approximation the equations (3) and (4) can be written as:

$$I_{q1} - X_{WPP}I_1^2 = I_{qPPC} \quad (5)$$

$$I_{d1} - R_{WPP}I_1^2 = I_{dPPC} \quad (6)$$

For small changes, equation (2) can be approximated by:

$$\Delta V_{PCC} = X_G \Delta I_{qPCC} + R_G \Delta I_{dPCC} + \Delta V_{UG} \quad (7)$$

In principle, to insert equations (5) and (6) in equation (7) an approximation of a small change for the quadratic form of $I_1$ could be as follows:

$$(I^2_1) = (I_{10} + \Delta I_1)^2 \approx I_0^2 + 2I_{10}\Delta I_1; \Delta I^2_1 \approx 2I_{10}\Delta I_1 \approx 2I_1 \Delta I_1 \quad (8)$$

where the sub-index "0" denotes the current value before the small change happened.

The small signal change for (5) and (6) reads:

$$\Delta I_{q1} - X_{WPP}(2I_1 \Delta I_1) = \Delta I_{qPPC} \quad (9)$$

$$\Delta I_{d1} - R_{WPP}(2I_1 \Delta I_1) = \Delta I_{dPPC} \quad (10)$$

Inserting equations (9), (10) in equation (7) yields:

$$\Delta V_{PCC} = X_{UG}(\Delta I_{q1} - X_{WPP}(2I_1 \Delta I_1)) + R_{UG}(\Delta I_{d1} - R_{WPP}(2I_1 \Delta I_1)) + \Delta V_{UG} \quad (11)$$

It is now supposed that the grid voltage is kept constant, i.e. $V_{UG}$=constant, or $\Delta V_{UG}$=0. Calculating $\Delta I_{q1}$ so as to keep the voltage variations at PCC equal to 0, that is to say $\Delta V_{PCC}$=0, yields:

$$\Delta I_{q1} = \left(\frac{R_{UG}R_{WPP} + X_{WPP}X_{UG}}{X_{UG}}\right)(2I_1 \Delta I_1) - \left(\frac{R_{UG}}{X_{UG}}\right)\Delta I_{d1} \quad (12)$$

The ostensive meaning of $\Delta I_{q1}$ in equation (12) is as follows: $\Delta I_{q1}$ is the reactive-power change to be injected by the wind turbine 1 at the wind turbine's terminals 6 in order to keep $V_{PCC}$ constant in spite of changes of the current injected by the wind turbine 1, assuming that $V_{UG}$ is constant. If nevertheless a change of $V_{PCC}$ is observed the assumption is wrong, i.e. the change can only be assigned to a change of $V_{UG}$. Therefore, the only cause of changes of $V_{PCC}$ which appear are changes due to changes of $V_{UG}$, and the central wind-park controller—which responds to changes of $V_{PCC}$—will only "see" changes of $V_{UG}$, and will therefore only control changes of $V_{UG}$. Injecting $\Delta I_{q1}$ according to equation (12) by the wind turbine 1 therefore decouples the central wind park controller from any disturbance caused by changes of the current injected by the wind turbine 1. The local correction is therefore also called "decoupling". Due to the decoupling, any change of $V_{PCC}$ can be essentially solely attributed to a change of $V_{UG}$.

The correction function (12) refers to small changes of $\Delta I_1$ and $\Delta I_{d1}$ and results in small changes of $\Delta I_{q1}$. In some embodiments the controller to which the decoupling correction is applied has differential characteristics. In those embodiments another correction function may be used which, when differentiated by the controller, gives the correction function (12) for $\Delta I_{q1}$ derived for small signal changes. For example, a suitable correction function for a differentiating controller is:

$$\text{correction function} = \left(\frac{R_{UG}R_{WPP} + X_{WPP}X_{UG}}{X_{UG}}\right)(I_1^2) - \left(\frac{R_{UG}}{X_{UG}}\right)I_{d1} \qquad (13)$$

Forming the total differential of (13)—which is effectively made by the differentiating controller—gives the right-hand side of equation (12).

In present embodiments the local correction is determined by the local wind-turbine controller on the basis of a function which has two additive terms. Each of these terms is a product of a constant and a current value, or the square of a current value, measured at the wind-turbine's terminals (or predicted to be present at the wind turbine's terminal). The constant depends on impedances of grid connections (optionally including grid elements, such as transformers, etc.) within the wind park and/or the utility beyond the point of common coupling.

In the exemplary approximation described above in connection with the equations (1) to (13) the constant of the first summand is $$\frac{R_{UG}R_{WPP} + X_{WPP}X_{UG}}{X_{UG}} \qquad (14)$$

and this first constant is multiplied by the square of the total current measured (or predicted) at the wind turbine's terminals, that is $I_1^2$. The constant of the second summand is $$-\frac{R_{UG}}{X_{UG}} \qquad (15)$$

and this second constant is multiplied by the active current measured (or predicted) at the wind turbine's terminals, that is $I_{d1}$.

FIG. 2: Wind Park

The exemplary wind park 2 of FIG. 2 has a plurality of wind turbines 1, individually denoted by 1.1, 1.2, 1.3, 1.4, and 1.5. Each wind turbine 1 is has a rotor 9 with rotor blades 10 rotatably supported in a nacelle 11 which is mounted on tower 12. The rotor 9 drives a generator 13. In order to enable variable rotor speed the electric current produced by the generator 13 is converted by a converter 38 (FIG. 3) to current adapted to the fixed grid frequency (e.g. 50 Hz or 60 Hz), e.g. by a full-scale converter or a converter of a doubly-fed induction generator (DFIG). The converter 38 enables current to be produced with an arbitrary phase, as desired, relative to the grid voltage, thereby enabling variable reactive power to be produced. The converter 38 also allows the voltage amplitude produced to be varied within certain limits. Each wind turbine 1 has a local controller 14 that commands the wind turbine's converter 38 to produce electricity with a specific phase and voltage.

Each wind turbine 1 has terminals 6 at which the wind turbine 1 outputs the electric power produced. The wind turbines 1 of the wind park 2 are electrically connected to a point of common coupling (PCC) 16 by a wind-park-internal grid 17. The internal grid has a tree-like structure in which the wind turbines 1 or, more specifically, the terminals 6, form the leaves of the tree, and the PCC 16 forms the root of the tree. The tree-like structure has branching points 18 at which the grid lines—seen in the direction from the PCC 16 to the wind turbines 1—branch into an increasing number of wind-park-internal branch lines 19.

Some of the impedances of sections of the internal branch lines 19 are symbolized by boxes denoted by 20a-20f. The total impedance $Z_{WPP}$ of an internal-grid connection connecting a wind turbine 1 and the PCC 16 is a series connection of the impedances 20 of the internal branch line sections through which current flows from the wind turbine 1 considered to the PCC 16, i.e. the sum of these impedances 20. For example, the impedance $Z_{WPP}$ of the wind turbine 1.2 is the sum of the impedances 20a, 20b, 20c, and the impedance of the short branch line between the branching point 18c and the terminals 6 of the wind turbine 1.2.

The PCC 16 is the point where the wind park is electrically connected to the utility grid 3, more specifically to the external branch line 5 which leads to the utility grid 3 (in the narrower sense) and is coupled to it at 8. For an off-shore wind park the external branch line 5 may be an undersea line which connects the wind park 2 to the utility grid on land. The branch line 5 includes a transformer 21, e.g., located immediately downstream of the PCC 16. The total impedance $Z_{UG}$ of the branch line 5 is the sum impedance of the transformer 21 and the impedance 15 of the line connecting the transformer 21 and the point 8 where the branch line 5 is coupled to the utility grid 3.

The wind park 2 is equipped with a central wind-park controller 22. The central wind-park controller 22 communicates with local wind-turbine controllers 14 via a control network 23. The control network 23 is, for example, implemented as a bus system, i.e. a CAN bus (ISO 11898) or an Ethernet bus (IEEE 802.3). In FIG. 2, control lines are drawn as broken lines to distinguish them from power-grid lines drawn as full lines. As can be seen from FIG. 2, the local wind-turbine controllers 14 are connected to a central bus line 24 of the central network 23 by bus branch lines 25, for example by switches arranged at the branching points between the central bus line 24 and the bus branch lines 25.

The central wind-park controller 22 has several inputs, two of which are illustrated in FIG. 2. One of the inputs is an external control input 26 through which an external entity, e.g., a utility grid operator can provide a prescription or demand information pertaining to the electricity to be delivered by the wind park 2. For example, the utility-grid operator can demand that the wind park 2 delivers a certain voltage V or amount of reactive power Q at the PCC 16 or another point in the internal grid 17, the branch line 5 or the utility grid 3. Other demands by the utility-grid operator may be an upper limit on the active power produced by the wind park 2, e.g. in the case of an over-frequency in the utility grid 3. The information signal for the external control input 26 is not necessarily a demand signal; in some embodiments it is a functional parameter which defines the central controller's response to parameters measured in the wind park 2. For example, in some embodiments it is the slope of a droop function defining a mapping of measured voltage to reactive power to be produced.

The second input to the central controller 22 illustrated in FIG. 2 is a central measurement input 27; it is, for example, a signal representing the voltage and/or reactive power measured at the PCM 4, which may be, for example, the PCC 16. Alternatively, the PCM 4 where the voltage and/or reactive power is measured may be upstream of the PCC 16 in the internal grid 17, or downstream the PCC 16 in the branch line 5, marked by 28 and 29 in FIG. 2.

The central wind-park controller 22 has a reference output 30 to the control network 23.

The local wind-turbine controllers 14 have several inputs, two of which are illustrated in FIG. 2. One of the inputs is a reference input 31 from the control network 23. The second input is a local measurement input 32. The signal representing the local measurement input 32 is the voltage and/or reactive power measured at the terminals 6 of the associated wind turbine 1.

Both the central wind-park controller 22 and the local wind-turbine controllers 14 are feedback controllers which compare two inputs and produce a control signal based on the difference between the two inputs.

The control network 23 is a bi-directional network enabling two-way communication between the central wind-park controller 22 and the local wind-turbine controllers 14. For example, the downlink direction (i.e. the direction from the central controller 22 to the local controllers 14) is used to send reference values, e.g., for voltage and/or reactive power, from the central controller 22 to the local controllers 14. The uplink direction may be used by the wind turbines 1 to return information about their current operational state, e.g. about the amount of active power currently produced, to the central controller 22 (only downlink arrows are drawn in FIG. 2).

The reference output 30 by the central wind-park controller 22 is, in some embodiments, a common reference value to all the wind turbines 1.1 to 1.5. In those embodiments, all the wind turbines 1 of the wind park 2 are requested to produce the same voltage or reactive power, according to the common reference value. This is illustrated by "$V_{ref}, Q_{ref}$ (common)" in FIG. 2. In other embodiments, the wind turbines 1 receive individual reference values from the central wind-park controller 22. For example, when some of the wind turbines 1 have informed the central wind-park controller 22 that they are operating at nominal power while other wind turbines 1 have informed the central wind-park controller 22 that they are operating at partial load (i.e. below nominal power) the central controller 22 can make use of a current margin still left in the converter 38 of the partial-load wind turbines 1 by requesting them, e.g. to produce more reactive power than the wind turbines operating at nominal power. Individual reference values are illustrated by "$V_{ref}, Q_{ref}$ (individual)" in FIG. 2.

Figure 3:
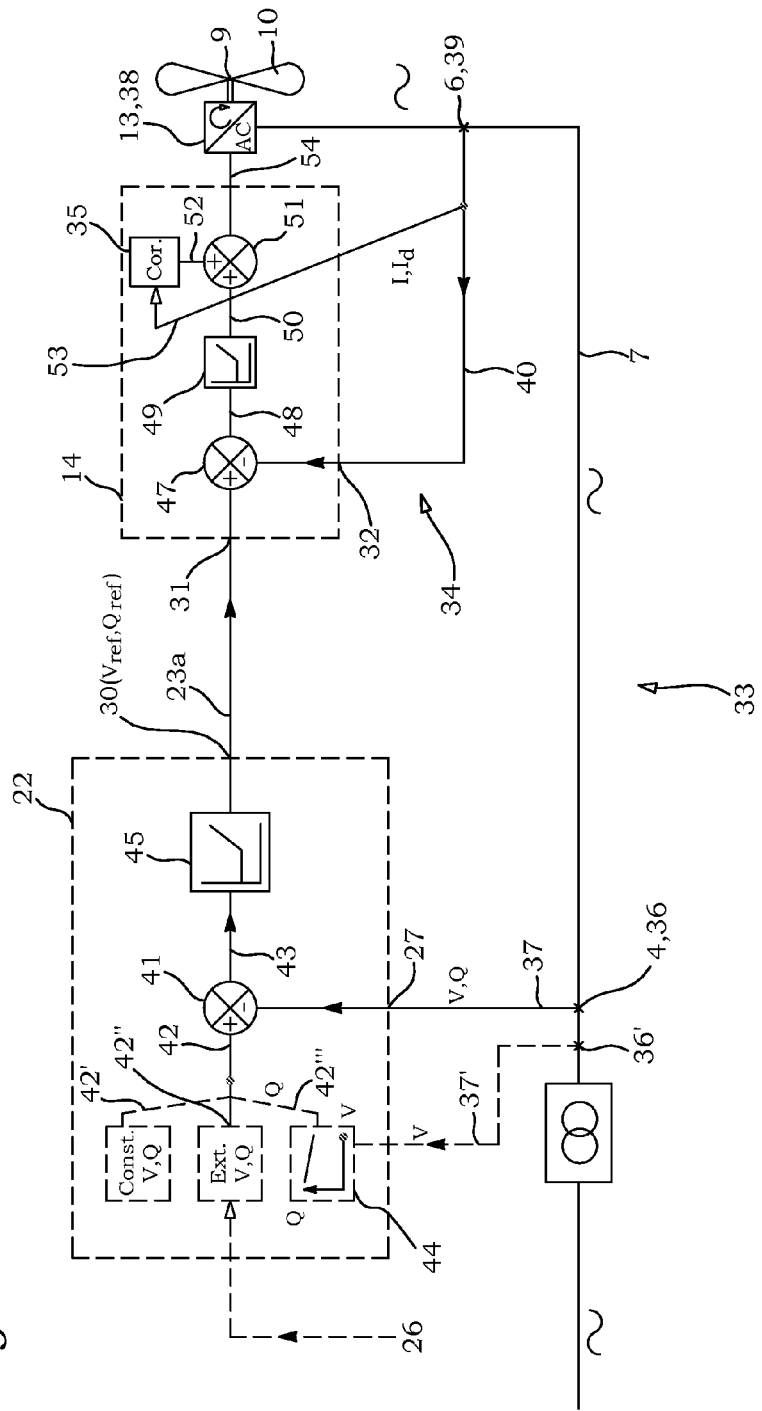
FIG. 3 is a schematic circuit diagram of a wind-park control system.

FIG. 3: Wind-Park Control System

The overall structure of the exemplary wind-park control system according to FIG. 3 has an outer (or wind-park) control loop 33, an inner (or local) control loop 34 with a local decoupler 35 at each wind turbine 1.

The outer control loop 33 shown in FIG. 3 includes the central wind-park controller 22 which produces the reference value $V_{ref}, Q_{ref}$, a part 23a of the control network 23 to transmit the reference value $V_{ref}, Q_{ref}$ from the central controller 22 to the wind turbine 1, the wind turbine 1 with the local wind-turbine controller 14, a part of the internal grid 17, more specifically the line 7 connecting the wind turbine's terminals with the point of common measurement 4 (the PCC 16 or the alternative measurement points 28, 29), a central measurement sensor 36 measuring electric parameters, such as the voltage, reactive power, etc., e.g. at the point of common measurement 4, and a central measurement-input line 37 from the central measurement sensor 36 to the central controller's central measurement input 27 which closes the outer control loop 33 to provide feedback to the central wind-park controller 22.

The inner control loop 34 is embedded in the outer control loop 33. It includes the local wind-turbine controller 14 which produces a converter-control signal, a converter 38 of the wind turbine 1 which supplies electric power to the wind turbine's terminals 6, a local measurement sensor 39 measuring electric parameters, such as the voltage, reactive power, etc., e.g. at the terminals 6, and a local measurement-input line 40 from the local measurement sensor 39 to the local controller's local measurement input 32 which closes the inner control loop 34 to provide feedback to the local wind-turbine controller 14. The inner control loop 34 is optional; in other embodiments the local wind-turbine controller 14 and the converter 38 comply with the central controller's reference value $V_{ref}, Q_{ref}$ without feedback.

The decoupler 35 is a special component of the local wind-turbine controller 14. It provides a correction signal to the outer control loop 33 (and the inner control loop 34, if applicable) based, e.g., on a measurement of the current produced by the wind turbine 1. The current measurement can be performed by means of the local measurement sensor 39 at the terminals 6. The decoupler 35 decouples the central wind-park controller 22 from the effects of changes of the current, or power, produced by the wind turbine 1. The correction by the decoupler 35 is feed-forward control combined with the feedback control performed by the central wind park controller 22. In principle, since the control activity of the central wind-park controller 22 is based on feedback, it would also ensure without any such overlaid feed-forward correction that the wind park finally outputs the target V or Q. However, without feed-forward correction, the target V or Q would be reached relatively slowly, for example due to the generally limited band-width of the communication line 23a from the central controller 22 to the wind turbine 1. The correction by the decoupler 35 instantaneously anticipates and compensates any change of V or Q at the point of common measurement 4 in a feed-forward manner, so that the central controller's remaining feedback control task is to control (counteract) any changes of $V_{UG}$. Any temporary control deviation due to the slowness of the feedback control is thereby avoided.

The elements of the wind-park control system according to FIG. 3 are now described in more detail.

The central wind-park controller 22 has a central subtractor 41 and a central error-signal processor 45. The central subtractor 41 determines the difference between a central target value 42 of V or Q and the actual value of V or Q measured at the point of common measurement 4. This difference is output as a central error signal 43 by the central subtractor 41 and fed to the central error-signal processor 45. The central error-signal processor 45 produces and outputs the reference value 30 ($V_{ref}$ or $Q_{ref}$).

Three alternative embodiments of central-target-value generation are illustrated in FIG. 3 by broken lines. In a first embodiment, the central target value 42' is a constant value of V or Q, which is, e.g. may be stored in the central wind-park controller 22. In this first embodiment the wind-park control system keeps the output of the wind park 1 at the PCC 4 constant at a V or C value corresponding to the central-target value 42', thereby implementing feedback control of the "constant control" type.

In a second embodiment, the central-target value 42" corresponds to, or is derived from, the external control input 26. The central-target value 42" is a prescription of V or Q, e.g. externally provided by a grid provider. In this second embodiment the wind-park control system keeps the output of the wind park 1 at the PCC 4 at the variable V or C value prescribed by the external V or Q prescription on the external control input 26, thereby realising feedback control of the "follower control" type.

In a third embodiment, the central-target value 42''' is produced by a droop controller 44. For example, droop control can be performed by measuring $V_{PCC}$ at the point of common measurement 4 and providing a Q reference $Q_{ref}$ to the wind turbine 1, derived from the measured voltage $V_{PCC}$. To that end, a central measurement sensor 36' (which may be the sensor 36) measures V at the point of common measurement 4, and the measured V value is transferred via a second central measurement-input line 37' to the droop controller 44. The droop controller's function is to map the measured V input to a Q output according to a droop function. The droop function is, for example, an affine-linear function (i.e. a function of the form Q=aV+b, where a may be positive or negative). The function parameters (a, b) may be predefined or externally provided by a grid provider. The output Q of the droop controller 44 is the central-target value 42''' input to the central subtractor 41. In general, droop control is feed-forward control in which a measured value (here: V) is mapped, in a feed-forward manner, to a control variable (here: Q). However, at an implementation level such feed-forward control can be implemented as feedback control to ensure that the wind-park actually complies with the prescription represented by the control variable (this is shown in the embodiment of FIG. 3).

The central error-signal processor 45 receives the central error signal 43 from the central subtractor 41 and produces the central controller's reference output 30 (in the terminology of control theory the error-signal processor would commonly be referred to as "the controller"; however, in the present text the term "controller" is used for the combination of the target-value providing component, the subtractor and what is commonly referred to as the controller). The central error-signal processor 45 has proportional and integral (PI) characteristics; i.e. it outputs a sum of the amplified and time-integrated input signal. In other embodiments it has proportional, integral, and differential (PID) characteristics; i.e. it outputs a sum of the amplified, time-integrated, and time-differentiated input signal. The output 30 is the reference value $V_{ref}$ or $Q_{ref}$.

The local wind-turbine controller 14 receives the reference value $V_{ref}$ or $Q_{ref}$ at its input 31. The local wind-turbine controller 14 has a local subtractor 47 and a local error-signal processor 49. The local subtractor 47 determines the difference between the reference value $V_{ref}$ or $Q_{ref}$ and the actual value of V or Q measured at the terminals 6 of the wind turbine 1 by the local measurement sensor 39 and fed to the local subtractor 47 via the local measurement input line 40. This difference—which represents a local error signal 48—is fed to the local error-signal processor 49.

The local error-signal processor 49 produces an uncorrected local controller's reference output 50 (again, in the terminology of control theory, the error-signal processor would commonly be referred to as "the controller"; however, in the present text the term "controller" is used for the combination of the local subtractor and what is commonly referred to as the controller). The local error-signal processor 49 has PI characteristics. In other embodiments it has PID characteristics.

The uncorrected local controller's reference output 50 is fed to a local adder 51. The other input to the local adder 51 is the correction 52 produced by the decoupler 35. The decoupler 35 receives measured current values as an input 53. Current measurement can be performed by means of the local measurement sensor 39 at the terminals 6. The local adder 51 determines the sum of the uncorrected local controller's reference output 50 and the correction 52 produced by the decoupler 35. The output of the local adder 51 is the corrected local controller's reference value 54. The corrected local controller's reference signal 54 causes the converter 38 to produce electricity with V or Q at the terminals 6 in accordance with the reference value represented by the corrected local controller's reference value 54.

Figure 4:
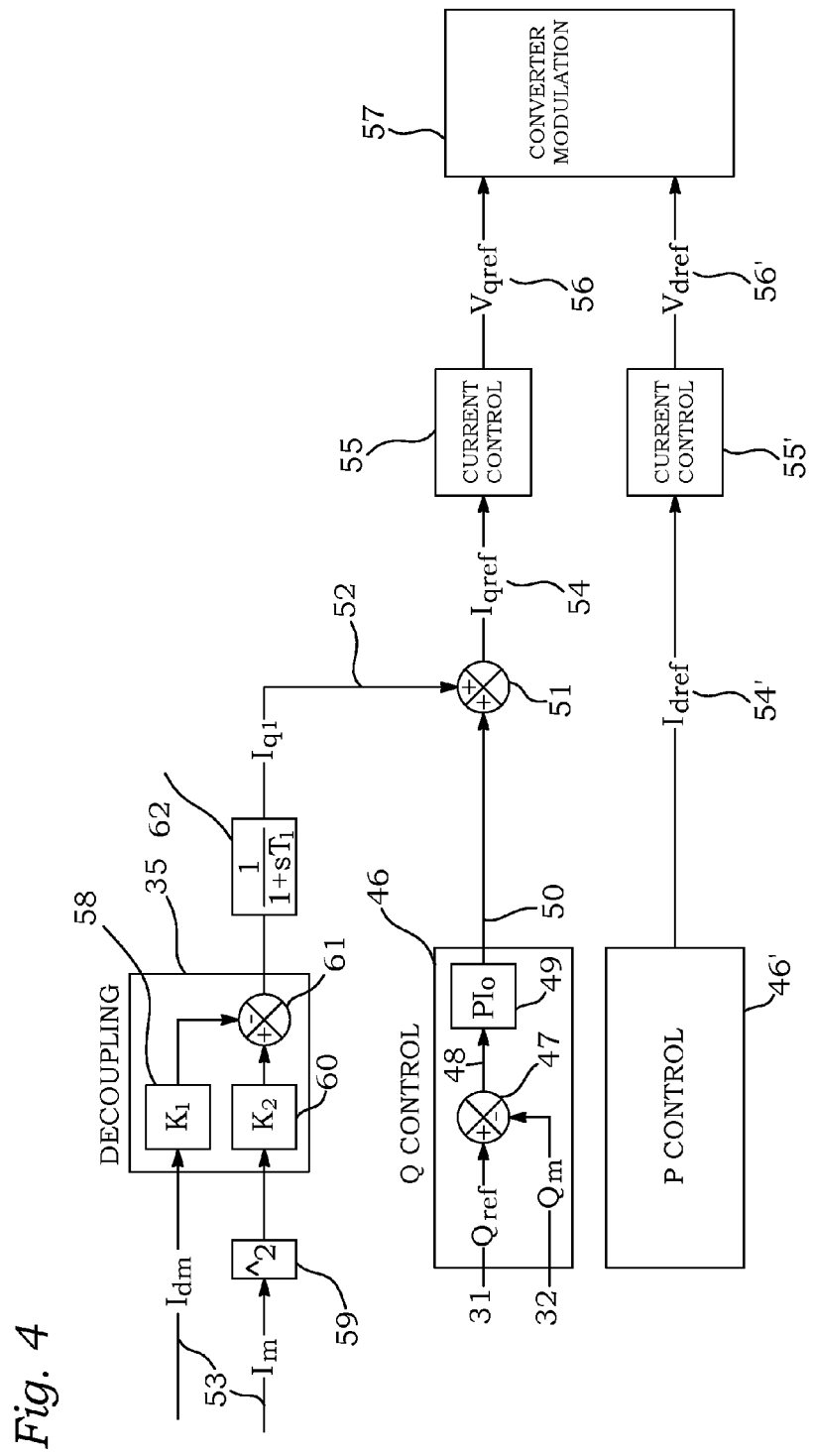
FIGS. 4 and 5 are schematic circuit diagrams of local wind-turbine controllers with decoupling functionality.
Figure 5:
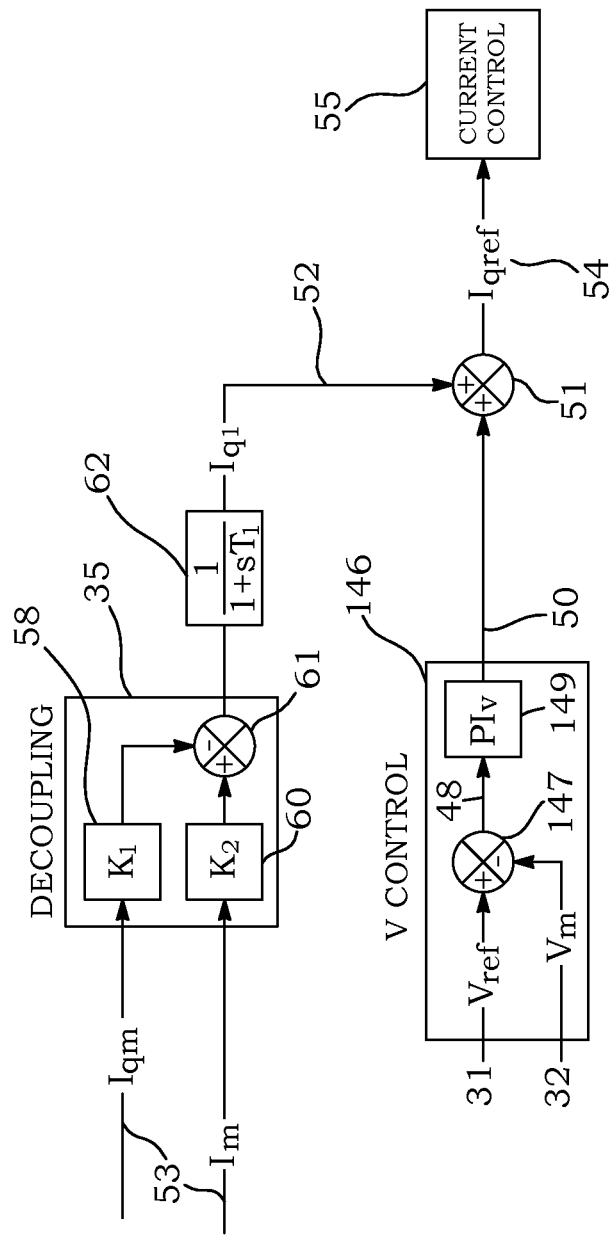

FIGS. 4 and 5: Local Wind-Turbine Controllers with Decoupling Functionality FIGS. 4 and 5 illustrate two different embodiments of local wind-turbine controllers 14. In the embodiment of FIG. 4 reactive-power control, or "Q control", is performed, that is to say the reference output 30 of the central wind-park controller 22 and reference input 31 to the local wind-turbine controller 14 is $Q_{ref}$. In the embodiment of FIG. 5 "V control" is performed, that is to say the reference output 30 of the central wind-park controller 22 and reference input 31 to the local wind-turbine controller 14 is $V_{ref}$.

In the Q control embodiment of FIG. 4 a Q controller 46 determines the difference between $Q_{ref}$ and the reactive power $Q_m$ produced by the wind turbine 1 and measured at its terminals 6, by means of the local subtractor 47. The resulting local Q-error signal 48 is scaled and integrated by the local PI processor 49. The local PI processor's output is the (still uncorrected) reference signal 50 for the reactive current $I_q$ to be produced by the wind turbine 1, based on the relation $Q=V \cdot I_q$ between Q and $I_q$, where V is the voltage $V_1$ of the internal grid 17 at the terminals 6.

The local adder 51 adds the local correction 52 to the uncorrected reactive-current reference signal 50. The output of the local adder 51 is the corrected local controller's reactive-current reference signal 54. Since—in some embodiments—the current provided by the converter 38 is controlled by voltage modulation, the corrected local controller's reference signal 54, or $I_{qref}$, is transformed by a reactive-current controller 55 into a reactive-voltage reference signal 56, or $V_{qref}$.

Control of the active power P by means of a P controller 46' is also illustrated in FIG. 4. As the active power P is normally not regulated by the central wind-park controller 22 no reference value for P from the central wind-park controller 22 is shown in FIG. 4. Owing to the fact that a wind turbine, at wind speeds below the wind turbine's nominal wind speed, is normally operated at its maximum efficiency to maximize yield, and above nominal wind speed the active power is limited to constant nominal power, the active power P is usually only locally controlled by the local wind-turbine controller 14. However, in some embodiments the central wind-park controller 22 can also provide a reference signal to control the active power P, e.g. to cope with overproduction occurrence. The P controller's output is a reference signal 54' for the active current $I_d$ to be produced by the wind turbine 1, based on the relation $P=V \cdot I_d$ between P and $I_d$, where V is the voltage $V_1$ of the internal grid 17 at the terminals 6. Since—in the embodiment of FIG. 4—the current provided by the converter 38 is controlled by voltage modulation, the local controller's reference signal 54', or $I_{dref}$, is transformed by an active-current controller 55' into an active-voltage reference signal 56', or $V_{dref}$. The reactive-voltage reference signal 56 and the active-voltage reference signal 56' are then combined and transformed by a converter modulator 57 into switch-timing signals that cause semi-conductor switches of the converter 38 to open and close at certain instants so as to produce the required reactive and active current.

The decoupler 35 produces the local correction 52 based on the input 53, that is to say the current value $I_m$ (the total current) and $I_{dm}$ (the active component of the total current) measured at the terminals 6. The measured active current $I_{dm}$ is multiplied at a first multiplier 58 by a constant $K_1$, that is $$-\frac{R_{UG}}{X_{UG}} \quad (15)$$

The measured total current $I_m$ is first squared at a squaring component 59, and the square of $I_m$ is then multiplied at a second multiplier 60 by a constant $K_2$, that is $$\frac{R_{UG}R_{WPP} + X_{WPP}X_{UG}}{X_{UG}} \quad (14)$$

The outputs of the first and second multipliers 58, 60, are summed by a decoupler-adder 61 the output of which is the local correction 52, or $I_{q1}$, in some embodiments. In other embodiments (an example of which is illustrated in FIG. 4) the output of the decoupler-adder 61 is filtered by a low-pass filter 62 to render the local correction robust against transient noise; the output of the low-pass filter 62 is the local correction 52, or $I_{q1}$, fed to the local adder 51.

In the embodiments of FIGS. 4 and 5 the local correction 52 is added downstream of the local subtractor 47 and the local PI processor 49. The time constant of the local PI processor 49 (including the low-pass filter 62, in embodiments with such a low-pass filter) is larger (or its band-width is smaller) than that of the decoupler 35 so that the local feedback control loop 34 does not immediately compensate for, and thereby cancel, a change of the local correction 52. When a change of the local correction 52 has occurred, the change will initially effectively modify the reference input 31, or $Q_{ref}$, to the local wind-turbine controller 14. After a time period corresponding to the local PI processor 49 has elapsed the local feedback control loop 34 compensates for, and thereby effectively cancels, the change which had appeared in the local correction 52. Thereby, the decoupler 35 only decouples the local wind-turbine controller 13 transiently from the central wind-park controller 22, i.e. only a change of the current produced occurs. As the condition progresses towards a steady-state, the effect of the decoupler 25 diminishes and finally disappears. The transient modification by the decoupler 35 to the reactive-current reference signal 50 is replaced by a corresponding gradual change of the reference input 31, or $Q_{ref}$, from the central wind-park controller 22. Thus, the effect of the decoupler 35 is gradually taken over increasingly by the outer feedback control loop 33. The decoupling has differential characteristics.

In the embodiment of FIG. 5 voltage control, or "V control", is performed instead of the Q control of FIG. 4. The reference output 30 of the central wind-park controller 22 and reference input 31 to the local wind-turbine controller 14 is a desired voltage, $V_{ref}$. Correspondingly, in the V control embodiment of FIG. 5 the analogy to the Q controller 46 of FIG. 4 is a V controller 146; it determines the difference between $V_{ref}$ and the voltage $V_m$ produced by the wind turbine 1 and measured at its terminals 6, by means of a local subtractor 147. The resulting local V-error signal 148 is scaled and integrated by the local PI processor 149. The voltage at the wind turbine's terminals 6 is controlled by the amount of reactive current $I_q$ produced by the wind turbine 1. Therefore, the local PI processor's output is a (still uncorrected) reference signal 50 for the reactive current $I_q$ to be produced by the wind turbine 1. As regards all the remaining elements 51-62 and their functionalities, including the local correction 52 and the P controller 46', 54'-56', reference is made to the description of FIG. 4 which also applies to the embodiment of FIG. 5.

Figure 6A:
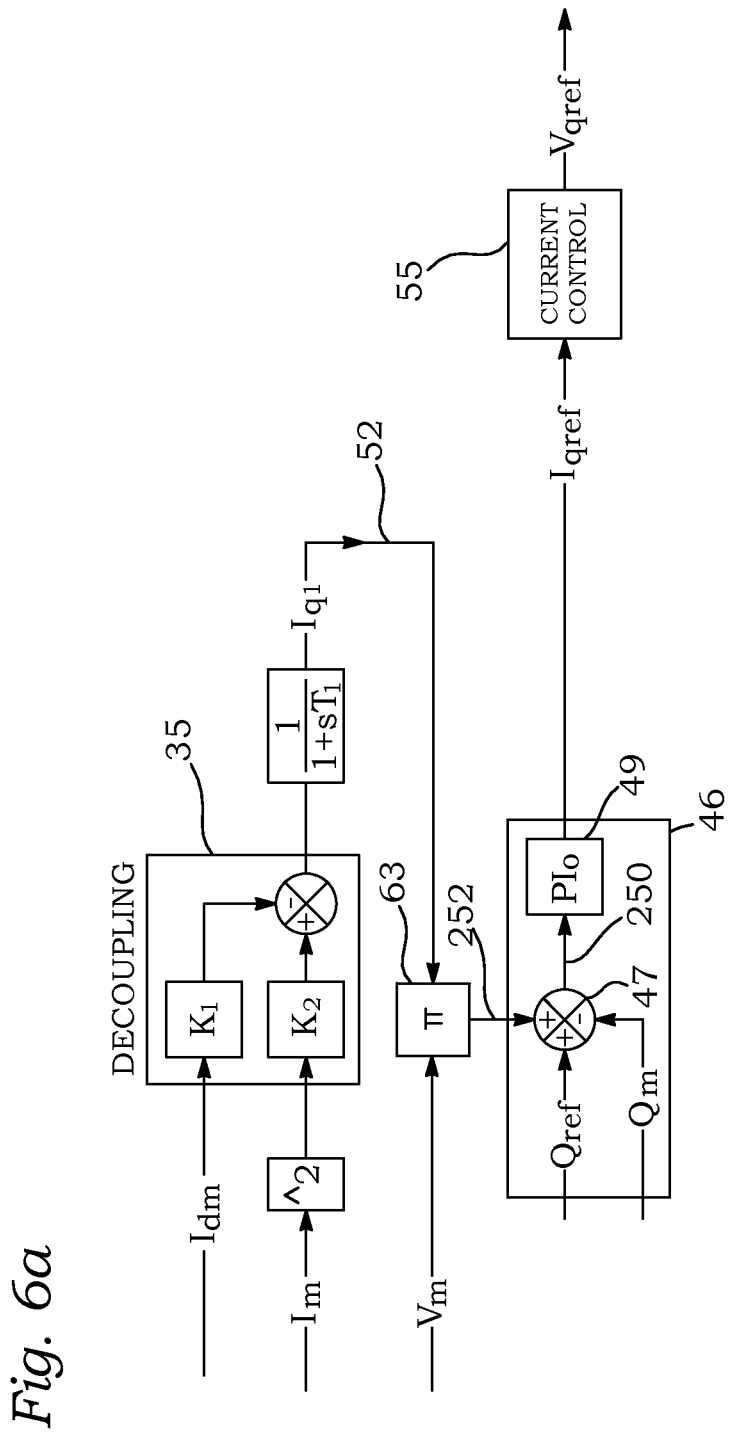
FIGS. 6a to c are schematic circuit diagrams similar to that of FIG. 4 of alternative ways of applying the decoupling correction in the local wind-turbine controller.
Figure 6B:
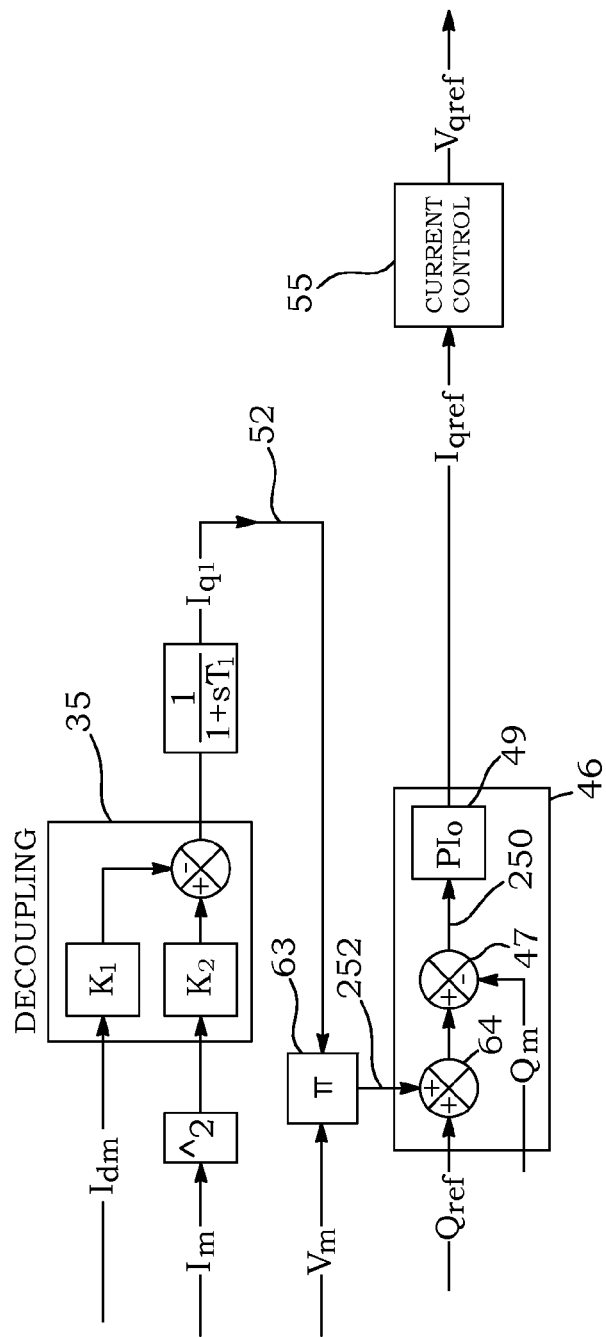
Figure 6C:
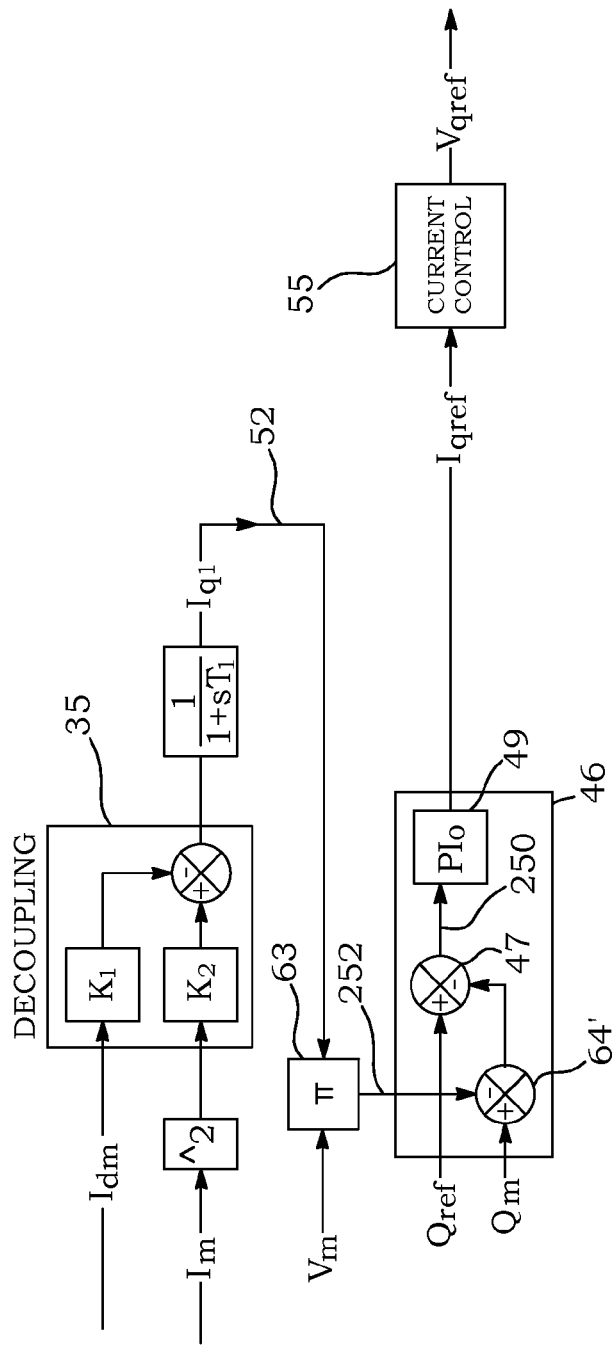

FIGS. 6a to c: Alternative Application of Decoupling Correction

In the embodiments of FIGS. 4 and 5 the local correction 52 is added downstream of the local subtractor 47 and the local PI processor 49. In the alternative embodiments of FIGS. 6a to c the local correction is applied at, or upstream of, the local subtractor 47 and the local PI processor 49. To this end, in Q control (analogous to FIG. 4) the local $I_q$ correction signal 52 produced by the decoupler 35 is multiplied at a third multiplier 63 by the voltage $V_m$. As a result, the $I_q$ correction signal 52 becomes a Q correction signal, denoted by 252 in FIGS. 6a to c, which can be added to, or subtracted from, a Q signal. In alternative V control (analogous to FIG. 5) the local $I_q$ correction signal 52 produced by the decoupler 35 is multiplied at the third multiplier 63 by a gain $G_Z$ representing the impedance from the wind turbine's terminals 6 to the point of common measurement 4. As a result, the $I_q$ correction signal 52 becomes a V correction signal, also denoted by 252 in FIGS. 6a to c, which can be added to, or subtracted from, a V signal.

In the embodiment of FIG. 6a the Q correction signal 252 is input in the local subtractor 47 which adds it to the difference between $Q_{ref}$ and $Q_m$. This result—which represents an already decoupler-corrected local error signal 250—is fed to the local error-signal processor 49. This replaces the decoupler-correction downstream of the local error-signal processor 49 in FIG. 4; no such downstream correction is carried out.

In the embodiment of FIG. 6b the Q correction signal 252 is applied to the reference signal $Q_{ref}$ (i.e. the central controller's reference output 30) upstream of the local subtractor 47 by means of a $Q_{ref}$ adder 64. The $Q_{ref}$ signal modified in this manner is input in the local subtractor 47. The output of the local subtractor 47—which represents an already decoupler-corrected local error signal 250—is fed to the local error-signal processor 49. This replaces the decoupler-correction downstream of the local error-signal processor 49 in FIG. 4; no such downstream correction is carried out.

In the embodiment of FIG. 6c the Q correction signal 252 is applied to the $Q_m$ signal (i.e. the signal representing the reactive power measured at the wind turbine's terminals 6) upstream of the local subtractor 47 by means of a $Q_m$ subtractor 64'. The $Q_m$ subtractor 64' subtracts the Q correction signal 252 from the $Q_m$ signal. The $Q_m$ signal modified in this manner is input as the subtrahend in the local subtractor 47, as described in connection with FIG. 4. The output of the local subtractor 47—which represents an already decoupler-corrected local error signal 250—is fed to the local error-signal processor 49. This replaces the decoupler-correction downstream of the local error-signal processor 49 in FIG. 4; no such downstream correction is carried out.

In the embodiments of FIGS. 6a-c the local correction 52 is applied upstream of the local subtractor 47 and the local PI processor 49. Therefore, in these embodiments the local feedback control loop 34 does not compensate for the local correction 52 in the steady-state limit, as in the embodiments of FIGS. 4 and 5. The decoupling has no differential characteristics; the local correction 52 based on equation (13) is nevertheless a good approximation. The central wind-park controller 22 will therefore not replace the local correction 52 by the decoupler 35 but will still correct any error made by the decoupler's feed-forward control, due to the feedback characteristics of the outer control loop 33.

As regards all the remaining elements and their functionalities, including the local correction 52 and the P controller 46', 54'-56', reference is made to the description of FIG. 4 which also applies to the embodiments of FIGS. 6a-c.

FIGS. 7a to g: Time Behavior of Different Control Parameters

The FIGS. 7a to g represent an exemplary time behavior of different control parameters of the wind-park control system. As an example, they refer to the embodiment of FIG. 4 and constant-voltage control (first alternative of FIG. 3). The seven time diagrams of FIGS. 7 a to g are aligned, and aligned points on the t-axes refer to the same point of time, i.e. the time diagrams are "synchronized".

Figure 7A:
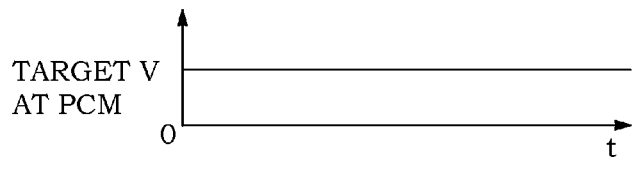
FIGS. 7a to g are schematic representations of different parameters of the wind-park control system vs. time.
Figure 7B:
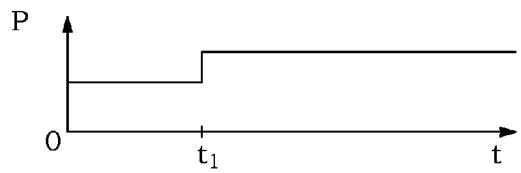

In the time interval illustrated, the target voltage V at the point of common measurement 4 is assumed to be constant in the present example, as illustrated in FIG. 7a.

Moreover, it is assumed in the present example that at time $t_1$ the wind speed rises, and that the active power P produced by a wind turbine operating in the partial-load mode (e.g. the wind turbine 1 of the previous figures) and injected into the internal grid 17 at the wind turbine's terminals 6 rises correspondingly. For the sake of illustration the active-power production is shown to be constant before and after $t_1$, and to exhibit a step-like increase at $t_1$, in FIG. 7b (this is an idealisation; in a real situation, the wind speed and the corresponding active-power production will always vary, and the variation will be continuous).

Figure 7C:
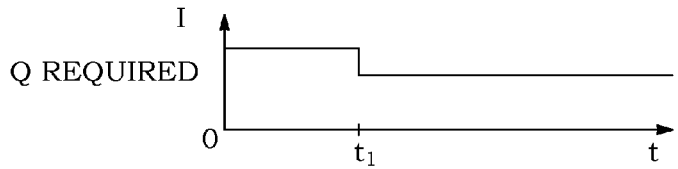

Owing to the impedance $Z_{WPP}$ of the line connecting the wind turbine's terminals 6 and the point of common measurement 4 the change of the active power produced would cause a change of the voltage V at the point of common measurement 4. However, in order to keep the voltage constant at the point of common measurement 4, as required (FIG. 7a), the amount of reactive power Q to be produced has to be modified at $t_1$ by a certain amount so as to compensate for the voltage change which would be caused by the active-power change. This is illustrated in FIG. 7c. Note that FIG. 7c illustrates a hypothetical requirement but does not represent the actual reference value $Q_{ref}$ provided by the central wind-park controller 22 because the communication between the central wind-park controller 22 and the local wind-turbine controller 14 is assumed to be relatively slow so that $Q_{ref}$ cannot respond to a change of the active-power production immediately at $t_1$ (the actual $Q_{ref}$ is only illustrated in FIG. 7f).

Figure 7D:
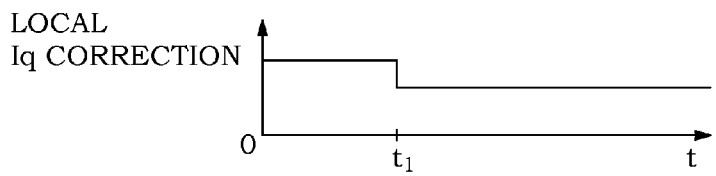

However, the local correction 52 is determined without any (significant) delay, and therefore causes, in a feed-forward manner, an immediate correction at $t_1$ of the local controller's $I_q$ reference output 50 (which is based on the central controller's $Q_{ref}$ signal 30). This is illustrated in FIG. 7d. The size of the local correction 52 is such that the wind turbine 1 produces the required for Q to compensate for the voltage change which would be caused at the point of common measurement 4 by the active-power change (as illustrated in FIG. 7c).

Figure 7E:
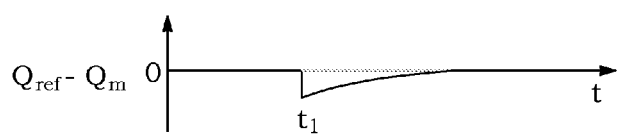

The feed-forward local correction 52 causes the actually produced reactive power, i.e. the reactive power $Q_m$ measured at the terminals 6, to deviate from the amount of active power $Q_{ref}$ commanded by the central controller's $Q_{ref}$ signal 30. This is illustrated in FIG. 7e by the difference between $Q_{ref}$ and $Q_m$ becoming non-zero at $t_1$. Owing to the fact that, in the exemplary embodiment of FIG. 4, the local correction 52 is applied downstream of the production of the local error signal 48, the local feedback controller 34 (which has a bigger time constant than the decoupler 35) slowly regulates away the non-zero difference between $Q_{ref}$ and $Q_m$; the slow decay of the difference between $Q_{ref}$ and $Q_m$ is also shown in FIG. 7e. In other embodiments in which the local correction is applied at, or upstream of, the production of the local error signal 48 the local feedback controller 34 (as in FIGS. 6a-c) causes the non-zero difference between $Q_{ref}$ and $Q_m$ to remain constant after $t_1$.

Figure 7F:
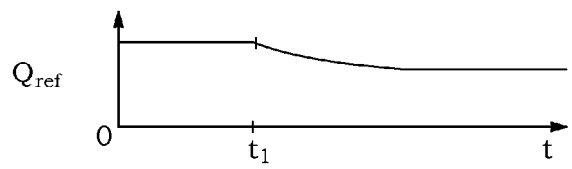

The slow decay of the difference between $Q_{ref}$ and $Q_m$ would cause the voltage at the point of common measurement 4 to deviate from the target voltage shown in FIG. 7a. However, the central wind-park controller 22 with its outer feedback loop 33 controls the voltage at the point of common measurement 4 to equal the target value and therefore adjusts its $Q_{ref}$ signal 30 accordingly, as illustrated in FIG. 7f. In other words, on a longer time-scale the central wind-park controller 22 takes over control from the local wind-turbine controller 14 by regulating away the local wind-turbine controller's 14 transient feed-forward control activity. This happens on a longer time-scale with which the outer feedback loop 33 is able to cope. In other embodiments, however, such as in FIGS. 6a-c, the $Q_{ref}$ signal 30 remains constant after $t_1$.

Figure 7G:
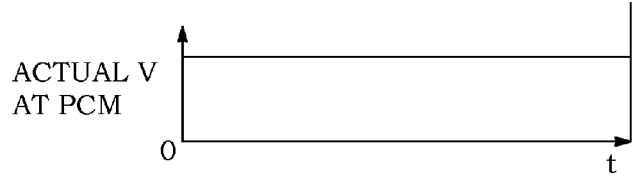

As a result of this interplay of local feed-forward correction and central feedback control, the actual voltage $V_{PCM}$ remains at its target value (FIG. 7a), as is illustrated in FIG. 7g. In the absence of such feed-forward correction, the voltage V at the point of common measurement would deviate from the target voltage at, and a certain period after, $t_1$, due to the slowness of the outer feedback loop 33.

The FIGS. 7a-g have been presented in the context of Q control, but apply to V control (an example of which is illustrated by FIG. 5) in an analogous manner.

The FIGS. 7a-g illustrate an example in which the target voltage is constant but the active power produced varies. In an analogous manner the effect of a change of the target parameter (e.g. a change of the target-reactive power) due to the impedance of the line between the wind turbine and the point of common measurement is anticipated and compensated for by the local correction. For example, an increase of the reactive power Q increases the total current $I_1$, and therefore enters in the correction term $K_2$ at 60 (FIGS. 4 and 5).

All publications mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of controlling an electric output of a wind park, the wind park comprising wind turbines, local wind-turbine controllers, a central wind-park controller, a point of common measurement, and an electric grid connecting the wind turbines and the point of common measurement, wherein grid connections between the wind turbines and the point of common measurement have electric impedances;
the method being carried out jointly by the wind turbines with their local wind-turbine controllers and the central wind-park controller, the method comprising:
producing electric currents, by the wind turbines, and supplying the electric currents to the electric grid;
measuring a value of an electric quantity at the point of common measurement and providing the measurement result to the central wind-park controller;
generating, by the central wind-park controller, at least one of a voltage-reference value and a reactive-power-reference value for a wind turbine, based on the measured value of the electric quantity at the point of common measurement, and providing the at least one of a voltage-reference value and a reactive-power-reference value to the local wind-turbine controller of the wind turbine; and causing the wind turbine, by the local wind-turbine controller, to produce at least one of a voltage and a reactive power in the electric grid at the location of the wind turbine which corresponds to the at least one of a voltage-reference value and a reactive-power-reference value, but which is corrected by a local correction produced by the local wind-turbine controller;

wherein the local correction takes into account at least one of a voltage change and a reactive-power change expected at the point of common measurement for the electric current supplied by the wind turbine due to the electric impedance of the grid connection between the wind turbine and the point of common measurement, said electric current taken into account by the correction being determined locally at the wind turbine.

2. The method of claim 1, further comprising controlling the electric output of the wind park by means of a feedback control loop with overlaid feed-forward controls, the feedback control loop being formed by the wind-park controller comparing the electric quantity measured at the point of common measurement with a central target value and deriving the reference values for the wind turbines from the comparison, and the local wind-turbine controllers causing the wind turbines to produce at least one of a certain voltage and a certain reactive power in the electric grid at the locations of the wind turbines, which in turn influences the electric quantity to be measured at the point of common measurement, the overlaid feed-forward controls being formed by the local corrections by the wind-turbine controllers, causing the wind turbines to produce an output corrected for a voltage change or a reactive-power change expected at the point of common measurement for the electric currents supplied by the wind turbines due to the electric impedances of the grid connections between the wind turbines and the point of common measurement.

3. The method of claim 1, wherein the point of common measurement is a point of common coupling of the wind park to an electric utility grid, or a point in an electric wind-park grid upstream of the point of common coupling, or a point in the utility grid downstream of the point of common coupling.

4. The method of claim 1, wherein there is a voltage and a reactive power in the electric grid at the point of common measurement, and wherein the electric quantity measured at the point of common measurement is at least one of the voltage and the reactive power at the point of common measurement.

5. The method of claim 1, wherein generating the reference value by the central wind-park controller comprises comparing the electric quantity measured at the point of common measurement, or another quantity derived from it, with a target value, and obtaining the reference value as a result of the comparison.

6. The method of claim 1, wherein generation of the reference value by the central wind-park controller comprises mapping the electric quantity measured by a droop function to the reference value.

7. The method of claim 1, wherein the reference values generated by the central wind-park controller are the same values for all the wind turbines, or are values proportional to each other, or are individual values for different wind turbines.

8. The method of claim 1, wherein a response by the local wind-turbine controller to a change in the central wind-park controller's reference value has a time constant, and wherein a response to the local correction has another time constant, and wherein the time constant of the response to the wind-park controller is bigger than that to the local correction.

9. The method of claim 1, wherein at least one of voltage and reactive power is measured in the electric grid locally at the wind turbine, and the local wind-turbine controller compares the locally measured value of the at least one of voltage and reactive power with the central wind-park controller's reference value to generate a local error signal on which control of the wind turbine is based, thereby forming a local feedback control loop.

10. The method of claim 9, wherein the local correction is applied downstream of the local-error-signal generation, at the local-error-signal generation, or upstream of the local-error-signal generation.

11. The method of claim 9, wherein the local error signal is transformed into a local current reference, the local correction is provided in the form of a current correction, and the local current reference is corrected by the current correction.

12. The method of claim 9, wherein the local correction is provided in a form corresponding to the central wind-park controller's reference, which is in the form of a voltage correction or reactive-power correction, and the local correction corrects the central wind-park controller's reference upstream of the local-error-signal generation, or corrects the locally measured voltage or reactive-power value, or is taken into account in the local-error signal generation.

13. The method of claim 1, wherein the local correction is determined on the basis of a function, wherein the electric current produced by the wind turbine is a variable of the function, wherein the electric current is not known to the wind-park controller a priori, because at least in an operating mode below nominal wind speed the electric current produced is governed by the wind speed, which may fluctuate and is first felt by the wind turbine.

14. The method of claim 1, wherein the electric current produced by the wind turbine can be represented by a total current, an active component of the current, and a reactive component of the current, and wherein the local correction is determined on the basis of a function which has at least two additive terms, one of the additive terms depending on the total current, and the other additive term depending on the active component of the current produced by the wind turbine.

15. A wind park, comprising wind turbines, local wind-turbine controllers, a central wind-park controller, a point of common measurement, and an electric grid connecting the wind turbines and the point of common measurement, wherein grid connections between the wind turbines and the point of common measurement have electric impedances;

wherein the wind park is arranged to control its electric output by jointly controlling the wind turbines by means of their local wind-turbine controllers and the central wind-park controller;

wherein the wind turbines are arranged to produce electric currents and supply them to the electric grid;

wherein the central wind-park controller is arranged to generate at least one of a voltage-reference value and a reactive-power-reference value for a wind turbine, based on a value of an electric quantity measured at the point of common measurement, and to provide the at least one of a voltage-reference value and a reactive-power-reference value to the local wind-turbine controller of the wind turbine;

wherein the local wind-turbine controller is arranged to cause the wind turbine to produce at least one of a voltage and a reactive-power in the electric grid at the location of the wind turbine which corresponds to the at least one of a voltage-reference value and a reactive-power-reference value, but which is corrected by a local correction produced by the local wind-turbine controller; and wherein the local correction is arranged to take into account at least one of a voltage change and a reactive-power change expected at the point of common measurement for the electric current supplied by the wind turbine due to the electric impedance of the grid connection between the wind turbine and the point of common measurement, said electric current taken into account by the correction being determined locally at the wind turbine.

* * * * *